3,028,425
N,N'-BIS(TRINITROALKYL)-UREAS
Paul F. Hartman, Clifton, N.J., assignor to United States Rubber Company, New York, N.Y., a corporation of New Jersey
No Drawing. Filed June 20, 1952, Ser. No. 294,735
7 Claims. (Cl. 260—553)

This invention relates to a new class of N-(2,2,2-trinitroalkyl)-amides and to a method of making them from trinitromethane, amides and aldehydes having at least two carbon atoms.

These new amides are useful as explosives, propellants and propellant plasticizers.

The new compounds of my invention are the N-(2,2,2-trinitroalkyl)-amides having the structure

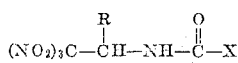

wherein R is an alkyl group and X is a radical chosen from the class consisting of alkyl, aryl, furyl, the radical

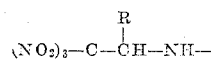

and the radical

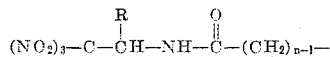

$n$ being an integer.

My new compounds are preferably made by mixing an appropriate aldehyde with trinitromethane in a suitable solvent followed by addition of an appropriate amide in a suitable solvent, which is usually the same one used with the other reagents. The mixture of the three reagents is usually stirred for one or two hours at 70–95° C. If the solvent is other than water, and is soluble therein, the reaction mixture is poured into water to precipitate the product. If the solvent is insoluble in water the mixture is concentrated to cause the product to crystallize. These procedures usually cause the product to precipitate or crystallize in a satisfactorily pure condition directly from the reaction mixture. However, if necessary the product may be recrystallized from an appropriate solvent.

I have found anhydrous or aqueous acetic acid to be a suitable reaction medium for making most of my new products. I also often use chloroform or carbon tetrachloride as the medium, especially when acetic acid is found to be unsuitable. The tests of suitability of a particular solvent are that it should dissolve a practical amount of the aldehyde and trinitromethane in one solution, and of the amide in the second solution, and that it should be inert in the reaction and easy to separate from the product.

Water also is a suitable solvent in making certain of the compounds of my invention; namely, those made from a water-soluble aldehyde, e.g., acetaldehyde and propionaldehyde. I have found that when aqueous solutions of the aldehyde and trinitromethane are mixed, a yellowish oil settles out of solution. This material is believed to be the postulated intermediate

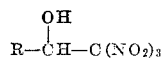

shown hereinafter, but which cannot be isolated and purified because it appears to be present in equilibrium with the two reagents. However, because of this formation of a second liquid phase it is advisable to stir the reaction mixture vigorously during and after the addition of the amide in order to attain optimum yield and purity of the product. The same object can also be achieved by adding an organic solvent, e.g., acetic acid, to the aqueous mixture in order to homogenize the solution during addition of the amide.

The probable reactions involved in my invention may be illustrated as follows:

(1) 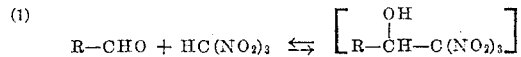

(2) 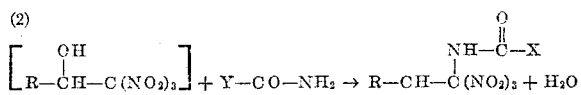

In equation 2 Y is selected from the class consisting of alkyl, aryl, furyl, amino and the radical

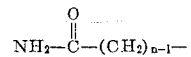

$n$ being an integer. When $n$ equals 1, the radical becomes

i.e., the amide used is oxamide.

The reaction is believed to proceed via the unisolated trinitroalkanol shown above. When an aldehyde, R—CHO where R is as given above, and an amide are first mixed under the conditions of my experiment and then trinitromethane is added the products of my invention are obtained only in very poor yield if at all. In the practice of my invention the order in which the reagents are mixed is thus seen to be critical, i.e., the aldehyde and the amide must not be mixed with one another in the absence of the trinitromethane.

P. O. Tawney has found, as disclosed in copending patent applications, Serial Numbers 61,922, 172,619 and 172,620, filed on November 24, 1948 and July 7, 1950 respectively that a methylolamide will react with trinitromethane to form an N-(2,2,2-trinitroethyl)-amide, as shown in the following equation as typified with acetamide:

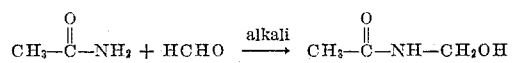

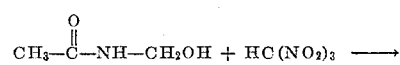

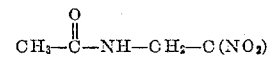

However, as previously indicated, this series of reactions is operable only with formaldehyde.

The compounds of Tawney's invention are crystalline materials which are useful as explosives and propellants. However, due probably to their low molecular weight, these previously known compounds are not important propellant plasticizers. Some of the compounds made from amides, aldehydes other than formaldehyde, and trinitromethane would be expected to be superior to those of Tawney's invention in this characteristic, and because of the large number of available aldehydes a great new class of compounds having properties which could be tailored to fit any individual explosive or propellant problem was envisaged. Unfortunately, it was found to be impossible to make such proposed new compounds from aldehydes other than formaldehyde by the process disclosed by Tawney. Therefore, it was an object of my invention to find a method of making the hitherto unknown class of compounds disclosed herein. This object I have now attained, as I have stated hereinabove, by mixing the aldehyde with the trinitromethane in the absence of the alkaline catalyst used in Tawney's invention, and subsequently adding the amide to the mixture.

Some of the compounds covered by my invention are more useful as explosives than as propellants and propellant plasticizers, whereas others of these compounds are useful chiefly in the latter field. The "oxygen balance" of any compound shows in general in which field of usefulness that compound is likely to fall. The oxygen balance is calculated according to the equation:

$$\text{Oxygen balance} = (O - 2C - \tfrac{1}{2}H)\frac{100 \times 16}{MW}$$

where O, C and H are the numbers of oxygen, carbon and hydrogen atoms respectively in a compound of molecular weight MW. The oxygen balance of most of the compounds used as explosives, propellants and propellant plasticizers is negative. In general, nitrogenous compounds with a relatively small negative balance; i.e., below —100, are likely to be useful as explosives, whereas compounds having negative oxygen balances —20 or even more are often useful as propellant plasticizers whether or not they contain nitrogen. For example trinitrotoluene has an oxygen balance of —74 and dimethyl phthalate, a plasticizer for propellants, has one of —173. As one ascends a homologous carbon series the oxygen balance becomes more negative. Therefore, it is evident that the compounds of this invention containing usually not more than eight carbon atoms are most likely to be used as explosives and propellants, whereas those containing a greater number of carbon atoms probably will have their chief use as propellant plasticizers. (Oxygen balance of $C_8H_{14}N_4O_7 = -92$. One isomeric material having this empirical formula is made from trinitromethane, propionaldehyde and n-butyramide, as described hereinafter in Example 7.)

The aldehyde used can be any saturated aliphatic aldehyde having at least two carbon atoms per molecule.

Typical aldehydes which can be used in my invention are acetaldehyde, propionaldehyde, n-butyraldehyde, isobutyraldehyde, n-hexaldehyde and n-heptaldehyde.

Any amide responding to the general formula given in Equation 2 above can be used in the practice of my invention.

Typical amides which can be used in my invention are the aliphatic amides, e.g., acetamide, propionamide, n-butyramide, and n-caproamide; amides having an aryl or heterocyclic group, e.g., benzamide and furoamide; and diamides such as urea, succinamide and adipamide.

The relative proportions of the three reagents are not critical, as will appear hereinafter. However, in large scale operation substantially equivalent proportions would preferably be used in the interest of economy.

The following examples illustrate the operation of my invention in more detail.

Example 1

Trinitromethane, 4.5 g., acetaldehyde, 1.0 g., and urea, 0.9 g., were added gradually to 25 ml. glacial acetic acid in the order shown. The solution was heated at 90–95° C. for an hour, and then was cooled and diluted with water, causing a white solid to precipitate in 60% yield (3.75 g.). This new compound, N,N'-bis-(1-(trinitromethyl)-ethyl)-urea, melted at 145° C. with decomposition after recrystallization from a mixture of chloroform and Skellysolve B (a petroleum fraction which is chiefly n-hexane). It flashes on a hot plate and detonates with a hammer blow. Oxygen balance —23.

Analysis.—Calcd. for $C_7H_{10}N_8O_{13}$: C, 20.3%; H, 2.42%; N, 27.0%. Found: C, 21.0, 20.6%; H, 2.40, 2.53%; N, 26.4, 26.9%.

Example 2

Trinitromethane, 3 g., and acetaldehyde, 0.65 g., were mixed in 10 ml. of water, causing a yellowish oil to settle to the btotom. (Both reagents are soluble in water.) A solution of 0.6 g. of urea in 10 ml. of water was gradually added to the first mixture with stirring, causing a white solid to begin precipitating almost at once. The mixture was warmed gently for 15 minutes with intermittent stirring by hand, in order to accelerate the reaction. The Example 1, was filtered, washed with water and dried. solid, which was the same new compound described in M.P. 140–142° C.

Example 3

To a mixture of 1.5 g. of trinitromethane and 0.6 g. of propionaldehyde in 10 ml. of glacial acetic acid was added 0.3 g. of urea in 10 ml. of acetic acid during 15 minutes. This mixture was heated for 20 minutes at 50–60° C., cooled and diluted with water to yield 0.6 g. (30% of theory) of a white solid melting at 110–112° C. This new compound N,N'-bis-(1-(trinitro-methyl)-propyl)-urea, was detonated with difficulty by a hammer blow. Oxygen balance —43.

Analysis.—Calcd. for $C_9H_{14}N_8O_{13}$: C, 24.4%; H, 3.17%; N, 25.3%. Found: C, 24.2, 24.1%; H, 2.80, 2.68%; N, 25.5, 25.7%.

When the reaction was carried out in the same manner as in Example 3 except that the trinitromethane in 10 ml. of acetic acid was added to a mixture of the urea and propionaldehyde in 10 ml. of acetic acid only a small amount of a sticky oil, and no solid, was obtained on cooling and diluting with water.

In two additional experiments the process disclosed by Tawney (loc. cit) for reacting amides with formaldehyde and subsequently reacting the so-formed methylol amides with trinitromethane was used with acetaldehyde and propionaldehyde respectively in unsuccessful attempts to make new products of Examples 1 and 3. In each of these two experiments urea and one of the respective aldehydes was mixed in a saturated aqueous solution of barium hydroxide, causing evolution of heat and formation of a yellow solution. Each solution was let stand for several minutes, and then the barium ions were precipitated with carbon dioxide. The solution was filtered, and trinitromethane was added to the filtrate. In each case the only material which precipitated was a sticky, viscous material which appeared to be polymeric. This material is assumed to be a polymer of urea with acetaldehyde or propionaldehyde respectively. There was no indication that the new compounds described in Examples 1 and 3 were formed.

Example 4

The experiment of Example 3, in which the urea was added to the other reagents, was repeated except that the time of heating was increased to one hour, thereby increasing the yield of the said product of Example 3 to 50% of theory.

Example 5

Example 3 was duplicated except that two 10 ml. portions of chloroform were used in place of the corresponding amounts of acetic acid, and the mixture was heated at the boiling point, 61° C., for 20 minutes, and then evaporated to dryness. The residue was dissolved in acetic acid and then precipitated with water, giving the said compound of Example 3 in 47% yield.

Example 6

To a mixture of 3 g. of trinitromethane and 1.2 g. of propionaldehyde in 20 ml. of chloroform was added dropwise a solution of 0.6 g. of acetamide in 15 ml. of chloroform. The mixture was boiled under reflux for an hour, cooled and evaporated to dryness to yield 1.1 g. (20% of theory) of a crude yellow solid which was recrystallized from aqueous methanol to give an almost white solid melting at 125–130° C. This new compound, N-(1-(trinitromethyl)-propyl)-acetamide, was detonated with difficulty by a hammer blow. Oxygen balance —64.

Analysis.—Calcd. for $C_6H_{10}N_4O_7$: C, 28.8%; H, 4.0%; N, 22.4%. Found: C, 29.2%; H, 4.1%; N, 21.7%.

Examples 7–11

To a mixture of the appropriate aldehyde and an equivalent amount of trinitromethane in 20 ml. acetic acid was added the appropriate amide in 15 ml. of acetic acid, and the solution was heated for 1–2 hours at 70–80° C., and then cooled and precipitated as in Example 2. The results are tabulated as follows. All of these new compounds are white solids which are not detonated by a hammer blow.

| Example | 7 | 8 | 9 | 10 | 11 |
|---|---|---|---|---|---|
| Aldehyde a | Propion-aldehyde. | Propion-aldehyde. | Propion-aldehyde. | n-Butyr-aldehyde. | Isobutyr-aldehyde. |
| Amt. in mol | 0.02 | 0.02 | 0.0086 | 0.028 | 0.02. |
| Amide | n-Butyr-amide. | Benzam-ide. | Furoam-ide. | n-Butyr-amide. | Caproam-ide. |
| Amt. in mol | 0.017 | 0.02 | 0.0086 | 0.028 | 0.024. |
| Yield, percent | 23 | 40 | 20 | 43 | 4. |
| Melting point, °C | 92–93 | 134–135 | 92–94 | 87 | 115. |
| Oxygen balance | −92 | −108 | −79 | −104 | −125. |

(a) Trinitromethane was used in the same molar amount as the aldehyde.

| Analysis | $C_8H_{14}N_4O_7$ | $C_{11}H_{12}N_4O_7$ | $C_9H_{10}N_4O_8$ | $C_9H_{16}N_4O_7$ |
|---|---|---|---|---|
| | Percent | Percent | Percent | Percent |
| Calcd. C | 34.5 | 42.3 | 35.8 | 37.0 |
| Found C | 34.8 | 42.2 | 36.1 | 36.8 |
| Calcd. H | 5.0 | 3.9 | 3.3 | 5.5 |
| Found H | 5.2 | 3.9 | 3.4 | 5.4 |
| Calcd. N | 20.1 | 18.3 | 18.5 | 19.2 |
| Found N | 19.9 | 17.3 | 17.6 | 19.1 |

*Example 12*

A mixture of 5 g. of trinitromethane, 3.76 g. of n-heptaldehyde and 2.3 g. of adipamide, partially dissolved in a mixture of 115 ml. of Skellysolve B, 25 ml. of toluene and 50 ml. of acetic acid, was boiled under reflux for 3 hours. The mixture was filtered hot to remove 1.1 g. of unreacted adipamide. The filtrate was cooled, causing 1 g. of a white solid to crystallize. This new compound, N,N'-bis-(1-trinitromethyl)-heptyl)-adipamide, melts at 140° C., and is not detonated by a hammer blow. Oxygen balance −123.

*Analysis.*—Calc'd. for $C_{22}H_{38}N_8O_{14}$: C, 41.4%, H, 6.0%, N, 17.6%. Found: C, 41.4%, H, 6.1%, N, 17.2%.

I claim:
1. A chemical compound having the formula

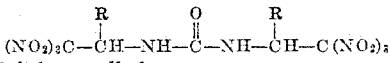

wherein R is lower alkyl.
2. N,N'-bis-(1-(trinitromethyl)-ethyl)-urea.
3. N,N'-bis-(1-(trinitromethyl)-propyl)-urea.
4. The process of making a chemical compound having the formula

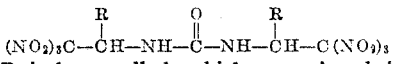

wherein R is lower alkyl, which comprises bringing together an aldehyde having the formula R—CHO and urea in the presence of trinitromethane.
5. The process of claim 4 wherein said aldehyde and trinitromethane are mixed together and said urea is subsequently incorporated with the mixture.
6. The process of claim 4 wherein said aldehyde is acetaldehyde.
7. The process of claim 4 wherein said aldehyde is propionaldehyde.

No references cited.